United States Patent [19]

Altermatt

[11] 3,997,520
[45] Dec. 14, 1976

[54] 5-NITROTHIAZOLYL-2-AZOPHENYL DISPERSE DYES

[75] Inventor: Ruedi Altermatt, Buckten, Switzerland

[73] Assignee: Sandoz Ltd., Basel, Switzerland

[22] Filed: July 11, 1974

[21] Appl. No.: 487,586

[30] Foreign Application Priority Data

July 17, 1973 Switzerland .................... 10388/73

[52] U.S. Cl. ................................ 260/158; 8/41 B; 8/41 C; 8/50
[51] Int. Cl.² .................................... C09B 29/36
[58] Field of Search ............ 260/158; 8/41 B, 41 C, 8/50

[56] References Cited

UNITED STATES PATENTS

| | | | |
|---|---|---|---|
| 2,683,708 | 7/1954 | Dickey et al. | 260/158 |
| 2,730,523 | 1/1956 | Dickey et al. | 260/158 |
| 2,746,953 | 5/1956 | Dickey et al. | 260/158 |

FOREIGN PATENTS OR APPLICATIONS

| | | | |
|---|---|---|---|
| 2,015,373 | 4/1970 | France | 260/158 |
| 2,051,806 | 4/1971 | France | 260/158 |

*Primary Examiner*—Charles F. Warren
*Attorney, Agent, or Firm*—Gerald D. Sharkin; Richard E. Vila; Melvyn M. Kassenoff

[57] ABSTRACT

This invention relates to monoazo compounds of the formula I,

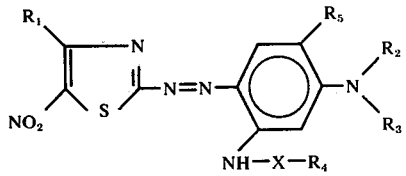

in which
$R_1$ signifies a hydrogen atom, an alkyl radical or an unsubstituted or substituted phenyl radical,
each of $R_2$ and $R_3$ signifies a hydrogen atom, a cycloalkyl radical, an alkenyl radical or an unsubstituted or substituted alkyl radical, with the proviso that when one of $R_2$ and $R_3$ signifies a hydrogen atom, the other has a significance other than hydrogen,
$R_4$ signifies an α- or β-chloro- or bromoethyl radical,
$R_5$ signifies a hydrogen atom or a methoxy or ethoxy radical, and
X signifies a group of the formula —CO—or —CO—O—.

These compounds are useful as disperse dyes, particularly for the exhaust dyeing, pad dyeing and printing of synthetic and semi-synthetic hydrophobic materials such as linear and aromatic polyesters, cellulose acetates and polyamides. The dyeings exhibit good fastness to light, heat treatments, wet treatments, solvents, lubricants, rubbing, cross-dyeing, ozone, gas fumes and chlorine.

14 Claims, No Drawings

5-NITROTHIAZOLYL-2-AZOPHENYL DISPERSE DYES

The present invention relates to monoazo compounds of low solubility in water, their production and use.

More particularly, the present invention provides monoazo compounds of formula I,

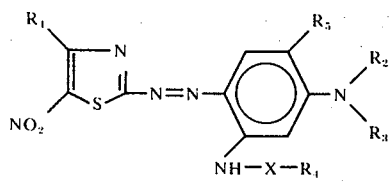

in which
R$_1$ signifies a hydrogen atom, a (C$_{1-6}$) alkyl radical, an unsubstituted phenyl radical or a phenyl radical substituted by one cyano group and/or by up to three substituents selected from the group consisting of chlorine and bromine atoms, each of R$_2$ and R$_3$, independently, signifies a hydrogen atom, a (C$_{2-6}$) alkenyl radical, a (C$_{5-7}$) cycloalkyl radical, an unsubstituted (C$_{1-6}$) alkyl radical or a (C$_{1-6}$) alkyl radical substituted by a cycloalkyl or cycloalkenyl radical, each of which contains from 5 to 8 carbon atoms, with the proviso that when one of R$_2$ and R$_3$ signifies a hydrogen atom, the other has a significance other than hydrogen, R$_4$ signifies an α- or β-chloro- or bromo-ethyl radical, R$_5$ signifies a hydrogen atom or a methoxy or ethoxy radical, and X signifies a group of the formula —CO— or —CO—O—.

The present invention further provides a process for the production of compounds of formula I, as defined above, comprising coupling a diazotized amine of formula II,

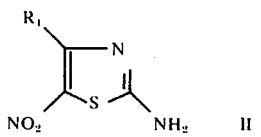

in which
R$_1$ is as defined above,
with a compound of formula III,

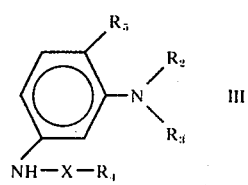

in which
X, R$_2$, R$_3$, R$_4$ and R$_5$ are as defined above.

The coupling reaction may be carried out according to conventional methods. The coupling reaction is conveniently carried out in an acid, optionally buffered, medium, e.g. at a pH of less than 5. Suitable reaction temperatures are below 20° C, preferably between −5° and +5° C. Suitable buffering agents include alkali metal salts of low molecular weight alkane acids, for example of acetic or propionic acid. The preferred buffering agent is sodium acetate.

The diazotization of the amine of formula II, as defined above, may be accomplished by known methods.

The compounds of formula II and III are known or may be prepared by known methods.

In the compounds of formula I, as defined above, where R$_1$ signifies a substituted phenyl radical, such radical is preferably monosubstituted.

Preferred compounds of formula I include those of formula I',

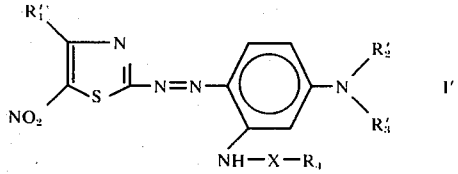

in which
R$_1$' signifies a hydrogen atom, a (C$_{1-2}$) alkyl radical, an unsubstituted phenyl radical or a phenyl radical substituted by a chlorine or bromine atom or by a cyano group, each of R$_2$' and R$_3$', independently, signifies a (C$_{1-4}$) alkyl, (C$_{2-4}$) alkenyl, cyclohexyl, cyclohexyl (C$_{1-4}$) cyclohexenyl (C or cyclohexenyl (C$_{1-4}$) alkyl, and
R$_4$ and X are as defined above.

In the compounds of formula I or I', where any of R$_2$ and R$_3$ or R$_2$' and R$_3$' signifies an alkenyl radical, such radical is preferably an allyl radical.

The preferred compounds of formula I', are those of formula I'',

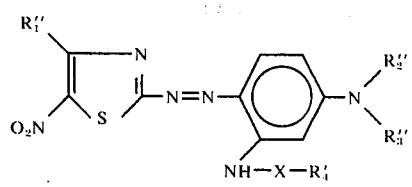

in which
R$_1$'' signifies a hydrogen atom or a methyl or phenyl radical, each of R$_2$'' and R$_3$'', independently, signifies an alkyl radical of 1, 2, 3 or 4 carbon atoms,
R$_4$' signifies β-chloroethyl or β-bromoethyl, and
X is as defined above.

In the compounds of formula I, I' and I'' those compounds where X is a radical of formula -CO- are preferred.

The preferred compounds of formula I'' are those of formula I''',

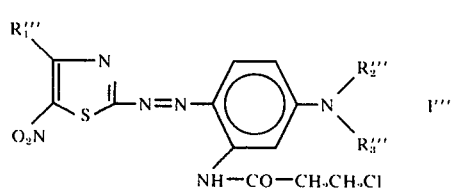

in which
R$_1$''' signifies a hydrogen atom or a methyl radical.

each of $R_2'''$ and $R_3'''$, independently, signifies an alkyl radical of 2, 3 or 4 carbon atoms.

The compounds of the invention are useful as disperse dyes. They are particularly useful for exhaust dyeing, pad dyeing or printing of substrates consisting of or comprising synthetic or semisynthetic organic fibres of high molecular weight and hydrophobic character. The substrate may be, for example, in loose fibre, yarn or fabric form. The compounds are especially suitable for dyeing or printing substrates consisting of or comprising linear or aromatic polyesters, cellulose 2½ acetate, cellulose triacetate and synthetic polyamide fibres.

It has been found that the compounds of formula I which contain an α- or β-chloroethyl or bromoethyl group are notably stable under dyeing conditions, particularly in high temperature processes.

The compounds of formula I, as defined above, may be converted into dyeing preparations according to known methods, for example, by grinding in the presence of dispersing agents and/or fillers, optionally with subsequent vacuum or atomizer drying. The preparations are dispersed in a suitable volume of water for application by exhaust dyeing, pad dyeing or printing methods.

Conventional dyeing and printing methods may be employed, for example, the process described in French Patent No. 1,445,371 may be used.

The dyeings obtained have notable all-round fastness, for example, notable fastness to light, thermofixation, sublimation and pleating. They have notable wet fastness properties, for example fastness to water, sea water, washing, perspiration and solvents, including dry cleaning liquors, and to lubricants, rubbing, cross-dyeing, ozone, gas fumes and chlorine. The dyes are stable to the pre-cure and post-cure permanent press finishing processes and to soil release finishes. The dyes reserve wool and cotton, are stable to reducing action in the dyeing of textiles containing wool, are stable to high temperature processes and their dischargeability is good.

The following Examples serve to further illustrate the invention. In the Examples all parts are by weight and the temperatures are in degrees centigrade.

EXAMPLE 1

14.5 Parts of 2-amino-5-nitrothiazole are slowly added at 0°–5° to a mixture consisting of 107 parts of nitrosyl sulphuric acid (produced by dissolution of 7 parts of sodium nitrite in 100 parts of concentrated sulphuric acid), 85 parts of glacial acetic acid and 15 parts of propionic acid. A mixture consisting of 85 parts of glacial acetic acid and 15 parts of propionic acid is added at 0°–5° to the resulting mixture. The mixture is subsequently stirred at 0°–5° over the course of 3 hours. A solution of 25.5 parts of 3-(β-chloropropionylamino)-1-N,N-diethylaminobenzene in 85 parts of glacial acetic acid and 15 parts of propionic acid is added dropwise. The resulting coupling mixture is stirred at 0°–5° over the course of 3 hours. The reaction mixture is then poured with stirring into a mixture consisting of 200 parts of water and 500 parts of ice, whereupon the dye of the formula

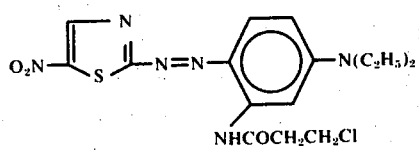

precipitates. The dye is filtered off, washed with water until it is free from acid and salt and then dried. The resulting dye is stable to high temperatures and dyes synthetic fibres in blue shades with good fastness properties. The dyes of the following Tables are produced in analogy with the process described in Example 1.

TABLE 1

General formula

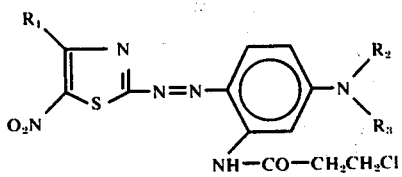

| Exp. No. | $R_1$ | $R_2$ | $R_3$ | Shade on polyester |
|---|---|---|---|---|
| 2 | H | —CH$_2$CH$_2$CH$_3$ | —CH$_2$CH$_2$CH$_3$ | blue |
| 3 | —CH$_3$ | " | " | " |
| 4 | " | —CH$_2$CH$_2$CH$_2$CH$_3$ | —CH$_2$CH$_2$CH$_2$CH$_3$ | " |
| 5 | H | " | " | " |
| 6 | —C$_2$H$_5$ | —C$_2$H$_5$ | —C$_2$H$_5$ | " |
| 7 | " | —CH$_2$CH$_2$CH$_2$CH$_3$ | —CH$_2$CH$_2$CH$_2$CH$_3$ | " |
| 8 | —C$_6$H$_5$ | —C$_2$H$_5$ | —C$_2$H$_5$ | " |
| 9 | —CH$_3$ | n-C$_4$H$_9$ | H | " |
| 10 | —⟨○⟩—Cl | —C$_2$H$_5$ | —C$_2$H$_5$ | " |
| 11 | —CH$_3$ | " | " | " |

TABLE 2

General formula:

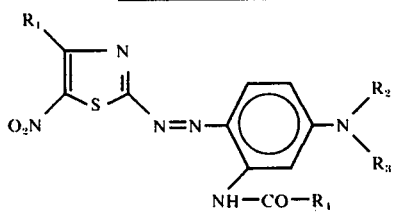

| Exp. No. | $R_1$ | $R_2$ | $R_3$ | $R_4$ | Shade on polyester |
|---|---|---|---|---|---|
| 12 | H | —CH$_2$CH$_3$ | —CH$_2$CH$_3$ | —CHCH$_3$ \| Cl | blue |
| 13 | —CH$_3$ | " | " | " | " |
| 14 | —C$_6$H$_5$ | " | " | " | " |
| 15 | " | " | " | —CH$_2$CH$_2$Cl | " |
| 16 | " | " | " | —CH$_2$CH$_2$Br | " |
| 17 | H | " | " | " | " |
| 18 | —CH$_3$ | " | " | " | " |
| 19 | " | " | " | —CHCH$_3$ \| Br | " |
| 20 | H | " | " | " | " |
| 21 | —C$_2$H$_5$ | —CH$_2$CH$_2$CH$_3$ | —CH$_2$CH$_2$CH$_3$ | —CHClCH$_3$ | " |
| 22 | " | n-C$_4$H$_9$ | n-C$_4$H$_9$ | —CH$_2$CH$_2$Br | " |
| 23 | " | —C$_2$H$_5$ | —C$_2$H$_5$ | " | " |

TABLE 3

General formula:

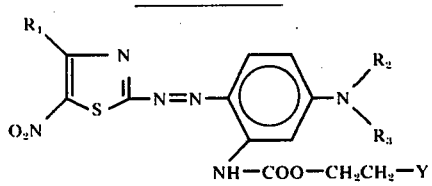

| Exp. No. | $R_1$ | $R_2$ | $R_3$ | Y | Shade on polyester |
|---|---|---|---|---|---|
| 24 | H | —CH$_2$CH$_3$ | —CH$_2$CH$_3$ | Cl | blue |
| 25 | —CH$_3$ | " | " | Cl | " |
| 26 | —C$_6$H$_5$ | " | " | Cl | " |
| 27 | " | " | " | Br | " |
| 28 | —CH$_3$ | " | " | Br | " |
| 29 | H | " | " | Br | " |

TABLE 3-continued

General formula:

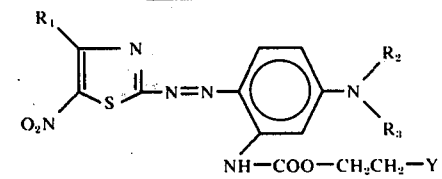

| Exp. No. | $R_1$ | $R_2$ | $R_3$ | Y | Shade on polyester |
|---|---|---|---|---|---|
| 30 | H | —CH$_3$ | —CH$_3$ | Br | " |
| 31 | H | " | " | Cl | " |
| 32 | —C$_2$H$_5$ | —C$_2$H$_5$ | —C$_2$H$_5$ | Cl | " |
| 33 | " | n-C$_4$H$_9$ | n-C$_4$H$_9$ | Cl | " |
| 34 | " | —C$_2$H$_5$ | —C$_2$H$_5$ | Br | " |

TABLE 4

General formula:

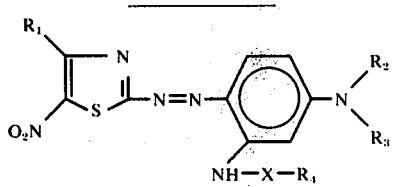

| Exp. No. | $R_1$ | $R_2$ | $R_3$ | $R_4$ | X | Shade on polyester |
|---|---|---|---|---|---|---|
| 35 | H | —CH$_2$CH$_3$ | —CH$_2$—CH=CH$_2$ | —CH$_2$CH$_2$Cl | —CO— | blue |
| 36 | —CH$_3$ | " | " | " | —COO— | " |
| 37 | " | " | —CH$_2$—⌬ | " | " | " |
| 38 | H | —CH$_3$ | —⟨H⟩ | " | —CO— | " |
| 39 | H | —CH$_2$CH$_3$ | —CH$_2$—⟨H⟩ | " | —CO— | " |
| 40 | —CH$_3$ | " | " | " | —COO— | " |

TABLE 4-continued

General formula:

[Structure: thiazole ring with $R_1$, $O_2N$, S, N, connected via $-N=N-$ to phenyl ring bearing $NH-X-R_4$ and $N(R_2)(R_3)$]

| Exp. No. | $R_1$ | $R_2$ | $R_3$ | $R_4$ | X | Shade on polyester |
|---|---|---|---|---|---|---|
| 41 | —C₆H₄—Cl | | | —CH₂CH₃ | | |
| 42 | —C₆H₄—Br | | | | —CO— | |
| 43 | —C₆H₄—CN | | | —CHCH₃ \| Cl | | |
| 44 | H | | —CH₂—C₆H₁₀(H) | | —CO— | |
| 45 | —CH₃ | | | | —COO— | |
| 46 | H | | —CH₂—C₆H₉ | —CH₂CH₂Cl | —CO— | |
| 47 | H | | | —CH₂CH₂Br | | |

The dyes of the following Table 5 correspond to formula I.

EXAMPLE A

7 Parts of the dye produced as described in Example 1, 4 parts of sodium dinaphthyl methane disulphonate, 4 parts of sodium cetyl sulphate and 5 parts of anhy-

TABLE 5

| Exp. No. | $R_1$ | $R_2$ | $R_3$ | $R_4$ | $R_5$ | X | Shade on polyester |
|---|---|---|---|---|---|---|---|
| 48 | H | —C₂H₅ | —C₂H₅ | —CH₂CH₂CL | —OCH₃ | —CO— | blue |
| 49 | —CH₃ | | | | | —CO— | |
| 50 | | | | | —OCH₂CH₃ | —CO— | |
| 51 | | | | | | —COO— | |
| 52 | H | | | | | | |
| 53 | H | | | | | —CO— | |
| 54 | H | n-C₃H₇ | n-C₃H₇ | | —OCH₃ | —CO— | |
| 55 | H | n-C₄H₉ | n-C₄H₉ | | | —CO— | |
| 56 | H | —C₂H₅ | —C₂H₅ | —CHCH₃ \| Cl | | —CO— | |
| 57 | H | n-C₄H₉ | H | —CH₂CH₂Cl | | —CO— | |
| 58 | —CH₃ | | H | | | —COO— | |
| 59 | H | —C₂H₅ | —CH₂—CH=CH₂ | | | —CO— | |
| 60 | H | | | | | —CO— | |
| 61 | H | | —CH₂—C₆H₁₀(H) C₂H₅ / —CH₂—C₆H₁₀(H) | | | —CO— | |
| 62 | H | —CH₃ | —CH₃ | | | —CO— | |
| 63 | —C₆H₅ | —C₂H₅ | —C₂H₅ | | | —CO— | |
| 64 | H | —CH₃ | —C₆H₁₀(H) | —CH₂CH₂Cl | —OCH₃ | —CO— | |
| 65 | —C₆H₄—Cl | —C₂H₅ | —C₂H₅ | | —OCH₂CH₃ | —CO— | |
| 66 | —C₆H₄—Br | | | —CHCH₃ \| Cl | | —CO— | |
| 67 | —C₆H₄—CN | | | —CH₂CH₂Br | —OCH₃ | —CO— | |
| 68 | H | | | —CH₂CH₂CL | | —COO— | |
| 69 | —CH₂CH₃ | | | | | | |
| 70 | | | | | | —CO— | |
| 71 | | | | | —OCH₂CH₃ | —CO— | | drous sodium sulphate are ground in a ball mill for 48 hours to give a fine powder.

1 Part of the powder is dispersed in a small amount of water and the dispersion is added through a sieve to a bath of 4000 parts of water containing 3 parts of sodium lauryl sulphate. The liquor ratio is 1:40. At 40°–50°, 100 parts of a scoured fabric of polyester fibre are entered into this dye bath, which is then set with an emulsion of 20 parts of a chlorinated benzene in water. The bath is raised slowly to 100° and the fabric dyed for 1 to 2 hours at 95°–100°. The fabric is dyed in brilliant blue shades, is washed, soaped, washed again and dried. The level dyeing has good fastness to light, cross dyeing, washing, water, sea water, perspiration, sublimation, gas fumes, thermofixation, pleating and permanent press finishing.

What is claimed is:

1. A compund of the formula

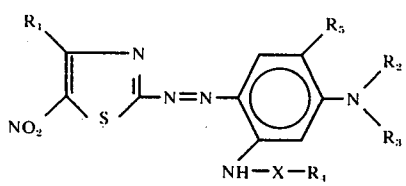

wherein
R$_1$ is hydrogen, alkyl of 1 to 6 carbon atoms or

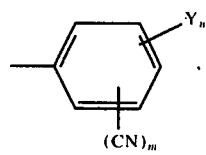

wherein each
Y is independently chloro or bromo,
m is 0 or 1, and
n is 0 to 3,
each of R$_2$ and R$_3$ is independently hydrogen, alkenyl of 2 to 6 carbon atoms, cycloalkyl of 5 to 7 carbon atoms, alkyl of 1 to 6 carbon atoms or alkyl of 1 to 6 carbon atoms monosubstituted by cycloalkyl of 5 to 8 carbon atoms or cycloalkenyl of 5 to 8 carbon atoms, with the proviso that at least one of R$_2$ and R$_3$ is other than hydrogen,
R$_4$ is chloroethyl or bromoethyl,
R$_5$ is hydrogen, methoxy or ethoxy, and
X is —CO— or —CO—O—.

2. A compound according to claim 1 wherein X is —CO—.

3. A compound according to claim 1 having the formula

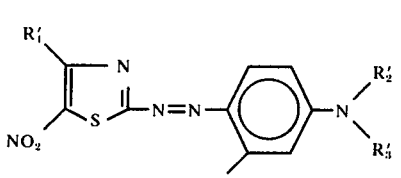

wherein

R$_1'$ is hydrogen, alkyl of 1 or 2 carbon atoms, phenyl or phenyl monosubstituted by chloro, bromo or cyano,
each of R$_2'$ and R$_3'$ is independently alkyl of 1 to 4 carbon atoms, alkenyl of 2 to 4 carbon atoms, cyclohexyl, alkyl of 1 to 4 carbon atoms monosubstituted by cyclohexyl or alkyl of 1 to 4 carbon atoms monosubstituted by cyclohexenyl,
R$_4$ is chloroethyl or bromoethyl, and
X is —CO— or —CO—O—.

4. A compound according to claim 3 wherein each of R$_2'$ and R$_3'$ is independently alkyl of 1 to 4 carbon atoms, allyl, cyclohexyl, alkyl of 1 to 4 carbon atoms monosubstituted by cyclohexyl or alkyl of 1 to 4 carbon atoms monosubstituted by cyclohexenyl.

5. A compound according to claim 3 wherein X is —CO—.

6. A compound according to claim 3 having the formula

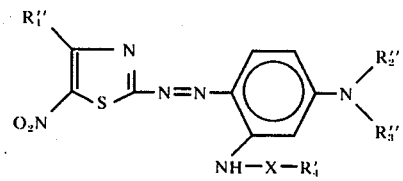

wherein
R$_1''$ is hydrogen, methyl or phenyl,
each of R$_2''$ and R$_3''$ is independently alkyl of 1, 2, 3 or 4 carbon atoms,
R$_4'$ is β-chloroethyl or β-bromoethyl, and
X is —CO— or —CO—O—.

7. A compound according to claim 6 wherein X is —CO—.

8. A compound according to claim 6 having the formula

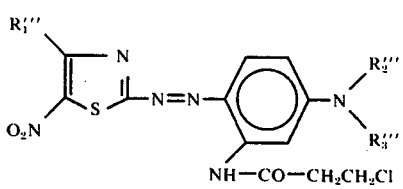

wherein
R$_1'''$ is hydrogen or methyl, and
each of R$_2'''$ and R$_3'''$ is independently alkyl of 2, 3 or 4 carbon atoms.

9. A compound according to claim 3 having the formula

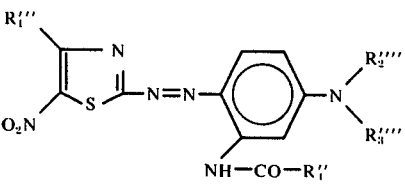

wherein
R$_1'''$ is hydrogen or methyl,
each of R$_2''''$ and R$_3''''$ is n-alkyl of 2 to 4 carbon atoms and $R_4''$ is chloroethyl.
10. The compound according to Claim 9 having the formula
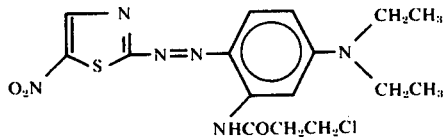
11. The compound according to claim 9 having the formula
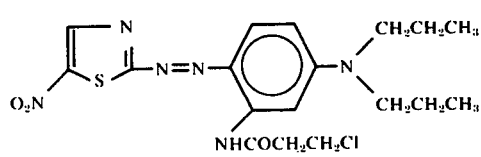
12. The compound according to claim 9 having the formula
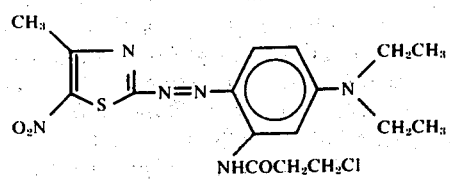
13. The compound according to claim 9 having the formula
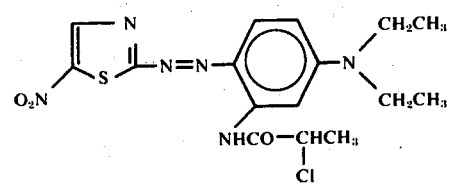
14. The compound according to claim 9 having the formula
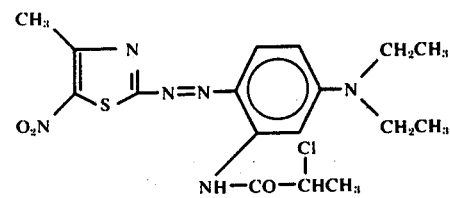
* * * * *